US009092530B1

(12) United States Patent
Fulbright et al.

(10) Patent No.: US 9,092,530 B1
(45) Date of Patent: Jul. 28, 2015

(54) SYSTEMS AND METHODS FOR RAPIDLY PROVISIONING VIRTUAL STORAGE OBJECTS

(75) Inventors: John K. Fulbright, Evans, GA (US); Clinton D. Knight, Apex, NC (US); Timothy E. Nicholson, Cary, NC (US)

(73) Assignee: NetApp, Inc., Sunnyvale, CA (US)

( * ) Notice: Subject to any disclaimer, the term of this patent is extended or adjusted under 35 U.S.C. 154(b) by 420 days.

(21) Appl. No.: 13/440,630

(22) Filed: Apr. 5, 2012

(51) Int. Cl.
*G06F 7/00* (2006.01)
*G06F 17/30* (2006.01)

(52) U.S. Cl.
CPC .... *G06F 17/30867* (2013.01); *G06F 17/30876* (2013.01)

(58) Field of Classification Search
CPC .................. G06F 17/30864; G06F 17/30867; G06F 17/30876
USPC .......................................................... 707/708
See application file for complete search history.

(56) References Cited

U.S. PATENT DOCUMENTS

| | | | | |
|---|---|---|---|---|
| 6,236,762 | B1 * | 5/2001 | Chui et al. | 382/250 |
| 2006/0181540 | A1 * | 8/2006 | Loo | 345/551 |
| 2009/0244625 | A1 * | 10/2009 | Hasegawa et al. | 358/1.17 |
| 2010/0201845 | A1 * | 8/2010 | Feinberg et al. | 348/231.99 |
| 2011/0264632 | A1 * | 10/2011 | Koifman et al. | 707/693 |
| 2011/0264872 | A1 * | 10/2011 | Koifman et al. | 711/154 |
| 2011/0276545 | A1 * | 11/2011 | Koifman et al. | 707/693 |
| 2011/0314208 | A1 * | 12/2011 | Feinberg et al. | 711/103 |

* cited by examiner

*Primary Examiner* — Mark E Hershley
(74) *Attorney, Agent, or Firm* — LeClairRyan, a Professional Corporation

(57) ABSTRACT

Systems and methods are disclosed for rapidly provisioning of virtual storage objects, whereby such rapid provisioning does not require clearing of physical storage resources when initialized for use in a virtual storage object. Accordingly, a virtual storage object of embodiments of the invention is provisioned without the time-intensive process of clearing (e.g., writing zeroes to) data blocks of the physical storage resources.

18 Claims, 2 Drawing Sheets

SYSTEMS AND METHODS FOR RAPIDLY PROVISIONING VIRTUAL STORAGE OBJECTS

TECHNICAL FIELD

The present invention relates generally to virtual storage objects, and, more particularly, to virtual storage objects which are provided using rapid provisioning techniques.

BACKGROUND OF THE INVENTION

A virtual hard disk is an abstraction which utilizes underlying physical storage media to present a storage image operable with one or more accessing systems as a storage resource. A virtual hard disk may be embodied as an image file providing mapping of virtual hard disk resources to physical storage resources (e.g., data blocks or other memory elements of physical hard disks, solid state disks, flash memory, optical memory, and/or other suitable computer readable media). A virtual hard disk may utilize various file systems, contain disk partitions, store files and folders, etc., thereby providing operation emulating that of a physical hard disk drive of arbitrary size.

There are two main virtual hard disk configurations: fixed-size virtual hard disks and dynamically expanding virtual hard disks. As the name suggests, fixed-size virtual hard disks provide a virtual hard disk of a predetermined, fixed size (e.g., 20 GB, 1 TB, or other selected size supported by the virtualization scheme and underlying physical storage resources). Dynamically expanding virtual hard disks provide a virtual hard disk wherein a maximum size of the dynamically expanding virtual hard disk is specified, and the dynamically expanding virtual hard disk is initially provisioned as a smaller virtual hard disk. As a dynamically expanding virtual hard disk is utilized and physical storage resources allocated thereto are utilized, the size of the dynamically expanding virtual hard disk is expanded to include allocation of additional storage resources, up to the aforementioned maximum size.

From the above, it can be appreciated that a fixed-size virtual hard disk presents a configuration in which the storage space of the fixed-size virtual hard disk is allocated on one or more underlying physical storage resources (e.g., one or more physical hard disks) when the fixed-size virtual hard disk is provisioned. That is, if a fixed-size virtual hard disk of 500 GB is to be provisioned, the full 500 GB of underlying physical storage resources used in providing the fixed-size virtual hard disk would be allocated to the fixed-size virtual hard disk during its provisioning, regardless of the amount of storage resources initially or even ultimately utilized by the fixed-size virtual hard disk. Because the physical storage resources for a fixed-size virtual hard disk must be allocated up front during creation, allocation of space is required even if the space is not used for storing data.

The physical storage resources allocated to the fixed-size virtual hard disk must be initialized for use as the fixed-size virtual hard disk. Such initialization generally requires the physical storage resources be cleared by overwriting the data thereof (referred to herein as clearing the physical storage resources), such as to have any data previously recorded thereon overwritten by zeroes, to prevent any existing data stored by the allocated physical storage resources from being accessible via the fixed-size virtual hard disk (e.g., for data security, to avoid the presence of spurious data, etc.). Such clearing of the physical storage resources requires overwriting the entire allocated space during provisioning of the fixed-size virtual hard disk. Thus, the fixed-size virtual hard disk creation speed is determined primarily by the time required for clearing those storage resources. For example, it requires approximately 1 hour and 40 minutes to provision a 500 GB fixed-size virtual hard disk, including clearing the physical resources allocated to the fixed-size virtual hard disk, using HYPER V MANAGER available from Microsoft Corporation.

It should be appreciated that, although fixed-size virtual hard disks are described above as having a predetermined, fixed size, such fixed-size virtual hard disks may sometimes nevertheless be reconfigured to provide a different (i.e., enlarged) fixed-size. In particular, a fixed-size virtual hard disk may be taken offline (i.e., rendered unavailable to accessing systems) and the fixed-size thereof increased. Provisioning of the reconfigured fixed-size virtual hard disk drive the proceeds similar to that of the initial fixed-size virtual hard disk provisioning. That is, the underlying physical storage resources used in providing the increase in size of the fixed-size virtual hard disk would be allocated to the fixed-sized virtual hard disk and clearing of the added physical storage resources performed. Accordingly, even where increasing the size of a fixed-size virtual hard disk is supported, provisioning of such incremental storage space incurs the initialization delays and unused physical storage resource allocation disadvantages discussed above.

A dynamically expanding virtual hard disk presents a configuration in which the size of the virtual hard disk, at any given time, corresponds to the actual data written to the dynamically expanding virtual hard disk (e.g., includes a number of physical hard disk data blocks to store the data of the virtual hard disk drive plus some level of overhead, such as metadata). Accordingly, a dynamically expanding virtual hard disk may start quite small and grow to its maximum allowable size as new data blocks in the dynamically expanding virtual hard disk are used to store data. For example, a dynamically expanding virtual hard disk may start with some minimal amount of storage space (e.g., 42 KB blocks of disk space) and grow to its maximum allowable size (e.g., 2040 GB) as new data blocks are used.

As can be appreciated from the foregoing, dynamically expanding virtual hard disks do not require all the physical storage resources needed to contain the maximum size of the disk to be allocated to the dynamically expanding virtual hard disk up front (as discussed above with respect to the fixed-size hard disk). However, the physical storage resources that are allocated for use as the dynamically expanding virtual hard disk must, nevertheless, be initialized including clearing of the physical data resources as discussed above with respect to the fixed-size virtual hard disk. Accordingly, although dynamically expanding virtual hard disks can be created relatively rapidly as compared to fixed-sized virtual hard disks (i.e., only initially clearing the smaller storage space of the dynamically expanding virtual hard disk), dynamically expanding virtual hard disks suffer from poorer performance during their use, during expansion, due to the allocation and initialization (i.e., clearing) of additional physical storage resources.

In addition to the aforementioned performance degradation associated with expansion of the dynamically expanding virtual hard disk, dynamically expanding virtual hard disks suffer from input/output (I/O) mis-alignment because of interleaving of meta-data and data blocks resulting from the ad-hoc addition of physical storage resources. In particular, an optimized configuration of physical storage resources and associated meta-data may not be provided as a result of the dynamic allocation of physical storage resources.

BRIEF SUMMARY OF THE INVENTION

Embodiments of the invention are directed to systems and methods for rapidly provisioning of virtual storage objects, such as for example, virtual hard disks, whereby such rapid provisioning does not require clearing of physical storage resources when initialized for use in a virtual storage object. Accordingly, a virtual storage object of embodiments of the invention is provisioned relatively rapidly, without the time-intensive process of overwriting (e.g., writing zeroes to) data blocks of the physical storage resources.

Rapidly provisioned virtual storage objects of embodiments may comprise thin-provisioned virtual storage objects that consume physical storage resources (e.g., data blocks of one or more underlying physical hard disk drives, solid state drives, etc.) only as data is written to the thin provisioned virtual storage objects, thereby providing efficient allocation of physical storage resources. Because rapid provisioning techniques in accordance with the concepts herein are implemented according to embodiments as physical storage resources are ultimately utilized by (e.g., allocated to) a thin provisioned virtual storage object, performance degradation associated with the overwriting of such physical storage resources is not experienced by thin provisioned virtual storage objects of embodiments.

Rapid provisioning of a virtual storage object such as, for example, a virtual hard disk, is provided according to embodiments of the invention using a zero-space virtual storage object image file. In rapid provisioning operation, such a zero-space image file is expanded to the desired size of the virtual storage object and the file is set valid according to embodiments. Thereafter, rapid provisioning operation de-allocates the data blocks mapping to the image file file and appending a data structure (e.g., virtual storage object footer) to the image file, thereby creating a rapidly provisioned thin but empty image file. Deallocated data blocks of a file may be read as zeroed blocks by a file system (e.g., a Write Anywhere File Layout (WAFL) file system). Accordingly, the deallocated data blocks of a rapidly provisioned virtual storage object are thereby read as having been zeroed, even where clearing of the data blocks (e.g., overwriting the data blocks with zeros) has not been performed. Accordingly, rapid provisioning of a virtual storage object according to embodiments of the invention facilitates rapid creation and/or growth of the virtual storage object and efficient allocation of physical storage resources. The foregoing de-allocation of the data blocks provides an operating system with an image file having a large capacity even though the actual resource allocation of the virtual storage object is much smaller. As a client or a user starts writing data to the virtual storage object, the real storage space allocated to the virtual storage object is expanded on the fly.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
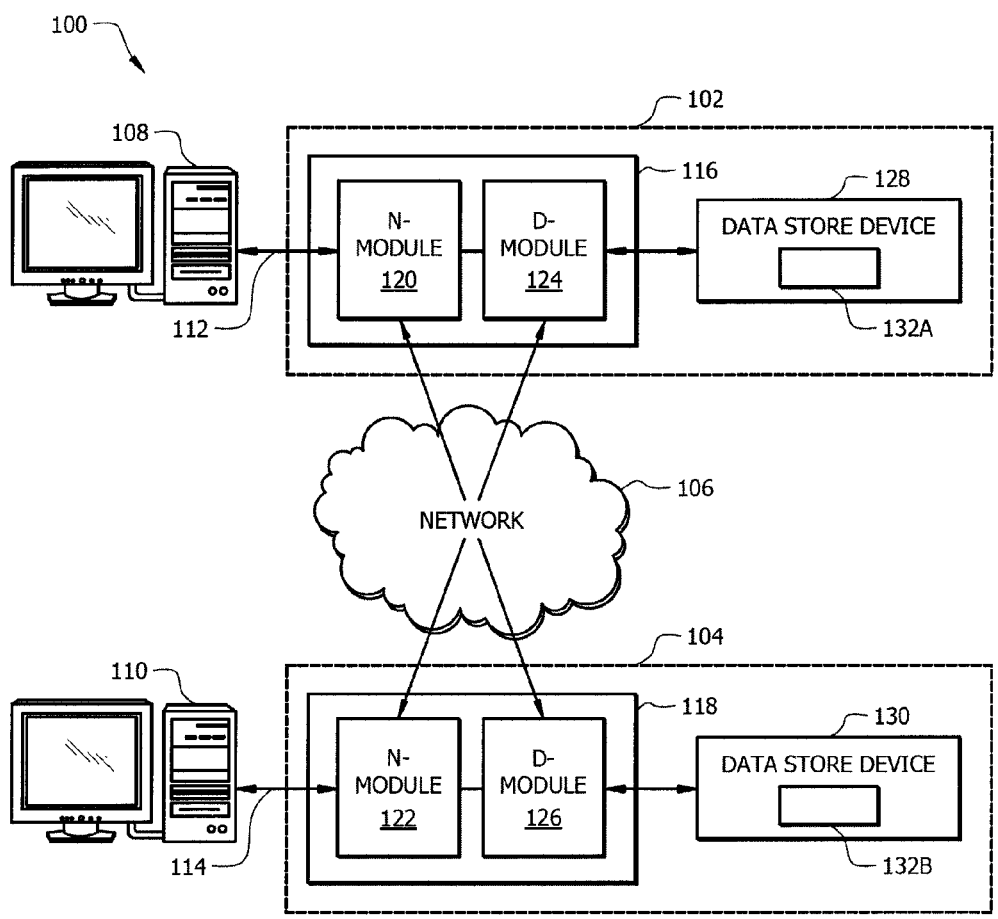
FIG. 1 is a block diagram of a system for building and hosting a thin-provisioned, fixed-format virtual hard disk.

FIG. 1 shows a block diagram of system 100 adapted according to embodiments of the invention for rapidly provisioning virtual storage objects, whereby such rapid provisioning does not require clearing of physical storage resources when initialized for use in a virtual storage object. The virtual storage objects, may, for example, be virtual hard disks. It should be noted that while the embodiments of the invention are described herein in connection with virtual hard disks, the invention and its underlying concepts are generally applicable to a variety of virtual storage objects such as may include virtual storage objects of any storage media other than disk drive media, such as solid state memory.

System 100 of FIG. 1 comprises an exemplary clustered network environment in which data storage systems 102 and 104 are coupled via network 106. Data storage systems 102 and 104 work together to provide the clustered network environment.

According to embodiments, data storage systems 102 and 104 may host a file system for managing various storage containers, such as volumes, Q-trees as well as virtual storage objects such as, for example, virtual hard disks. Data storage systems 102 and 104 of embodiments may comprise one or more modules, components, etc. operable to provide operation as described herein. For example, data storage systems 102 and 104 of the illustrated embodiment comprise nodes 116 and 118 and data store devices 128 and 130, respectively. It should be appreciated that the nodes and/or data store devices of the data storage systems 102 and 104 may themselves comprise one or more modules, components, etc. Nodes 116 and 118 of the illustrated embodiment comprise network modules (referred to herein as "N-Modules") 120 and 122 and data modules (referred to herein as "D-Modules") 124 and 126, respectively.

Network modules 120 and 122 may be configured to allow nodes 116 and 118 to connect with client systems, such as clients 108 and 110 over network connections 112 and 114, to allow the clients to access data stored in data storage systems 102 and 104. Moreover, network modules 120 and 122 may provide connections with one or more other components of system 100, such as through network 106. For example, network module 120 of node 116 may access data store device 130 via network 106 and data module 126 of node 118. Also, node 116 can forward the data to data store device 128 using data module 124. Although storage systems 102 and 104 are illustrated with equal numbers of N-Module and D-Module, there can be differing numbers of N-Module and D-Module in storage systems 102 and 104.

Data store devices 128 and 130 of the illustrated embodiment may comprise virtual hard disks 13A and 132B, respectively. Accordingly, the modules, components, etc. of data storage systems 102 and 104 may comprise various configurations suitable for providing operation of rapidly provisioning virtual storage objects as described herein. Nodes 116 and 118 of embodiments may comprise processor-based systems, such as file server systems, computer appliances, computer workstations, etc. Accordingly, nodes 116 and 118 of embodiments comprise a processor (e.g., central processing unit (CPU), application specific integrated circuit (ASIC), programmable gate array (PGA), etc.), memory (e.g., random access memory (RAM), read only memory (ROM), disk memory, optical memory, flash memory, etc.), and suitable input/output circuitry (e.g., network interface card (NIC), wireless network interface, display, keyboard, data bus, etc.). The foregoing processor-based systems may operate under control of an instruction set (e.g., software, firmware, applet, code, etc.) providing operation as described herein.

Data store devices 128 and 130 may, for example, comprise disk memory, flash memory, optical memory, solid state drives, and/or other suitable computer readable media. Data modules 124 and 126 of nodes 116 and 118 may be adapted to communicate with data store devices 128 and 130 according to a storage area network (SAN) protocol (e.g., small computer system interface (SCSI), fiber channel protocol (FCP), INFINIBAND, etc.) and thus data store devices 128 and 130 may appear a locally attached resources to the operating system. That is, as seen from an operating system on nodes 116 and 118, data store devices 128 and 130 may appear as locally attached to the operating system. In this manner, nodes 116 and 118 may access data blocks through the operating system, rather than expressly requesting abstract files.

Clients 108 and 110 of embodiments comprise a processor (e.g., CPU, ASIC, PGA, etc.), memory (e.g., RAM, ROM, disk memory, optical memory, flash memory, etc.), and suitable input/output circuitry (e.g., NIC, wireless network interface, display, keyboard, data bus, etc.). The foregoing processor-based systems may operate under control of an instruction set (e.g., software, firmware, applet, code, etc.) providing operation as described herein. It will be appreciated that clients 108 and 110 may comprise user stations (e.g., processor-based systems such as computers, tablet devices, smart phones, personal digital assistants, etc.) and/or servers (e.g., processor-based systems such as computer based server platform, running on a Windows server or a linux operating system) operable as client devices to storage systems 102 and/or 104 (e.g., utilizing storage services thereof). Data store devices 128 and 130 of the illustrated embodiment may comprise virtual hard disks 132A and 132B, respectively.

Network 106 may comprise various forms of communication infrastructure, such as a SAN, the Internet, the public switched telephone network (PSTN), a local area network (LAN), a metropolitan area network (MAN), a wide area network (WAN), a wireless network (e.g., a cellular communication network, a wireless LAN, etc.), and/or the like. Network 106, or a portion thereof may provide infrastructure of network connections 112 and 114 or, alternatively, network connections 112 and/or 114 may be provided by network infrastructure separate from network 106, wherein such separate network infrastructure may itself comprise a SAN, the Internet, the PSTN, a LAN, a MAN, a WAN, a wireless network, and/or the like.

According to embodiments, rapidly provisioned virtual storage objects (shown in the illustrated embodiment as virtual hard disks 132A and 132B) are provided in data store devices of a storage system. In the illustrated embodiment, virutal hard disks 132A and 132B are provisioned in data store devices 128 and 130, respectively, although rapidly provisioned virtual storage objects in accordance with the concepts of the invention may utilize more than one data store devices (i.e., provided partially in a plurality of data store devices), client 108 may access rapidly provisioned virtual hard disk 132A via connection 112 or may access rapidly provisioned virtual hard disk 132B via connection 112 and network 106. Similarly, client 110 may access rapidly provisioned virtual hard disk 132B via connection 114 or may access rapidly provisioned virtual hard disk 132A via connection 114 and network 106.

One or more instruction sets (e.g., software, code, etc.) for rapidly provisioning virtual hard disks according to embodiments resides in client 108 and/or client 110. Client 108 and/or client 110 may utilize the instruction set to rapidly provision virtual hard disks 132 A and 132 B in data store devices of the data storage system as described in further detail below. It should be appreciated, however, that instructions sets for rapidly provisioning virtual storage objects may reside in other components of system 100.

According to embodiments, rapidly provisioned virtual hard disks 132A and 132B may comprise thin-provisioned virtual hard disks that consume physical storage resources (e.g., data blocks of one or more underlying physical hard disk drives, solid state drives, etc.) only as data is written to the thin provisioned virtual hard disk, thereby providing efficient allocation of physical storage resources. Because rapid provisioning techniques in accordance with the concepts herein are implemented according to embodiments as physical storage resources are ultimately utilized by (e.g., allocated to) a thin provisioned virtual hard disk, performance degradation associated with the overwriting of such physical storage resources is not experienced by thin provisioned virtual hard disks of embodiments herein.

Figure 2:
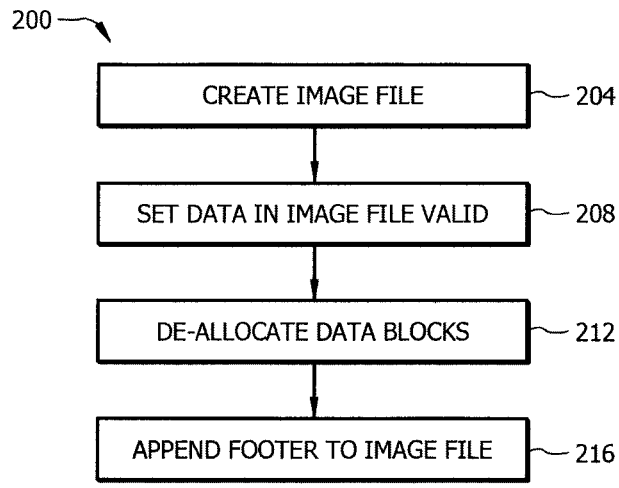
FIG. 2 is a high-level flow diagram of a method for building a thin-provisioned, fixed-format virtual hard disk.

Before providing a detailed description of a method of rapidly provisioning a virtual storage object according to embodiments of the invention, a high-level flow diagram of rapidly provisioning a virtual storage object is shown in FIG. 2. In step 204, an image file of a desired size is created. The image file contains resources (e.g., volumes) that map to data blocks and other memory elements of one or more source disks residing in data store devices 128 or 130. In step 208, data in the image file is set valid. Consequently, an operating system does not automatically start clearing the data blocks (e.g., writing zeroes to the data blocks) mapping to the image file during creation. In step 212, the data blocks mapping to the image file are de-allocated, thereby creating a rapidly provisioned virtual hard disk image file. Deallocated data blocks of a file may be read as zeroed blocks by a file system (e.g., a Write Anywhere File Layout (WAFL) file system). Accordingly, the de-allocated data blocks of a rapidly provisioned virtual hard disk are thereby read as having been zeroed should read access to the virtual storage object be initiated, even where clearing of the data blocks (e.g., overwriting the data blocks with zeros) has not been performed. In step 216, the image file is converted to a virtual hard disk by appending a footer to the image file. The foregoing de-allocation of the data blocks provides an operating system with an image file having a large capacity even though the actual resource allocation of the virtual storage object is much smaller. As a client or a user starts writing data to the virtual storage object, the real storage space allocated to the virtual storage object is expanded on the fly.

Figure 3:
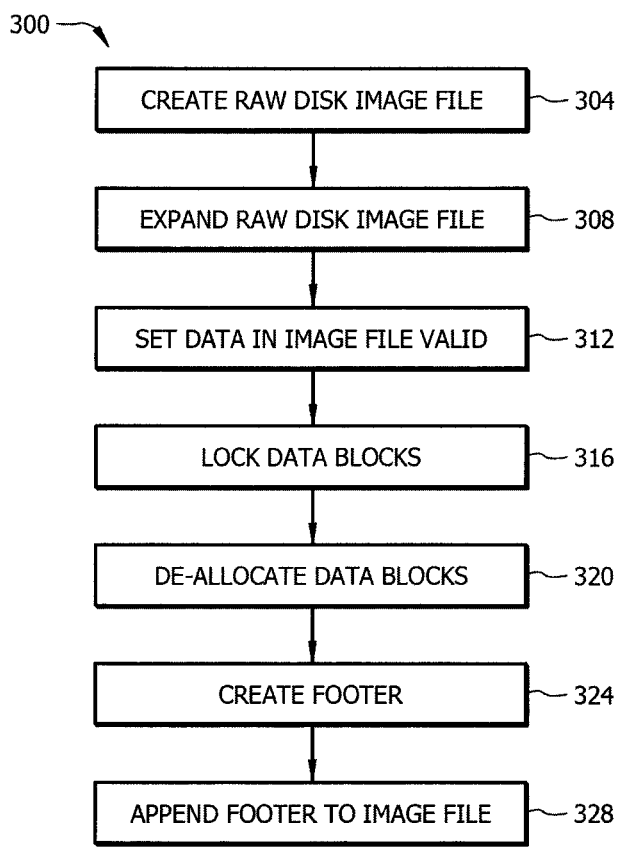
FIG. 3 is a detailed flow diagram of a method for building a thin-provisioned, fixed-format virtual hard disk.

FIG. 3 is a detailed flow diagram of the method steps for building a virtual storage object, such as virtual hard disks 132A and 132B, according to embodiments of the invention. In step 304, a raw disk image file having an initial size is created. According to embodiments, the initial size of the raw disk image file may be a predetermined size such as, for example, zero (e.g., zero byte). According to embodiments, this predetermined size value may be input by a user and/or stored in clients 108 and/or 110 for use in rapidly provisioned virtual storage object creation. The raw disk image file may reside in, for example, data store device 128 and/or 130.

Clients 108 and/or 110 may initiate the creation of the raw disk image file responsive to a command from a user or responsive to a script running on a predetermined schedule. According to embodiments, an application code running on client 108 and/or client 110 invokes an API, such as, for example a Windows API, to create the raw image file, which provides an operating system with a file path to create the raw image file on a location on a storage disk (e.g., data store device 128 and/or 130). It will be appreciated that a raw disk image file contains data structures representing a storage medium, such as, for example, a hard drive, a flash memory, an optical disk.

In step 308, the size of the raw disk image file is expanded from zero to a desired size (e.g., 20 GB). It will be appreciated that the desired size may depend on user requirements or other selection criteria. According to embodiments, an instruction code running on client 108 and/or client 110 issues a command to enlarge the raw disk image file to the desired size. Client 108 and/or 110 may, for example, invoke a Windows NTFS API SetEndOfFile to enlarge the raw disk image file to the desired size. In response, the operating system sets the image file to the desired size.

In step 312, the data in the expanded image file is set valid. According to embodiments, an instruction set operable on client 108 and/or client 110 invokes an operating system command to inform the file system to treat the image file as valid. Client 108 and/or client 110 may, for example, invoke a Windows NTFS API SetFileValidData to inform an NTFS file system to treat the image file as valid. In response, the file system updates its internal meta-data and the raw disk image file is not zeroed because the file appears to the file system to have already been initialized due to the data being valid. As a result, the image file is prevented from being cleared (zeroed) before normal read/write operations to the image file begins through invocation of the set valid operation.

In step 316, the data blocks mapping to the expanded image file are locked and the location of the data blocks are determined. According to embodiments, an instruction set running on client 108 and/or client 110 issues a command to the file system to lock all data blocks associated with the image file. By way of example, an application code running on client 108 and/or client 110 may invoke a Windows API DeviceIoControl with a control code of FSCTL_MARK_HANDLE, which accepts a handle to the image file and locks all data blocks associated with the image file until the handle is closed. It will be appreciated that certain types of software, such as disk defragmentation tools, may physically move files on an underlying physical media, which is undesirable during creation of the virtual hard disk. Thus, the data blocks mapping to the image file are locked so that they remain fixed in position during the process.

In step 320, data blocks mapping to the image file are de-allocated According to embodiments, an instruction code running on clients 108 and/or 110 instructs the storage systems 102 and/or 104 to to de-allocate the data blocks mapping to the image file by sending in-band SCSI commands to storage systems 102 and 104. Alternatively, the data blocks can be de-allocated using out-of-band Data ONTAP APIs sent over an HTTP connection. This causes storage systems 102 and/or 104 to un-map or disassociate logical block addresses of the image file from any physical blocks in the data store device 128. Thus, the logical blocks do not map to any physical blocks in the data store devices 128 and/or 130.

It will be appreciated that by de-allocating the data blocks, the volumes mapping to the data blocks are thin-provisioned. The thin-provisioned volumes do not consume the full physical storage resource space of the virtual storage volume size, whereby physical storage resource space will be allocated for use by the thin provisioned virtual storage object as data stored thereto demands. If read access is made to a portion of the thin provisioned virtual storage object which does not have physical storage resources allocated thereto, zeroes will be returned as if the portion of the thin provisioned virtual storage object has cleared physical storage resources allocated to these portions. Thus, the foregoing de-allocation of the data blocks provides the operating system with an image file used according to embodiments of the invention to create a virtual storage object having a large capacity even though the actual resource allocation of the virtual storage object is much smaller. For example, by de-allocating the data blocks, thus thin-provisioning the volumes, a 2 terabyte virtual storage object may be provided to the operating system, while in reality only few giga bytes are allocated. As a client or a user starts writing data to the virtual storage object, the physical storage space allocated to the virtual storage object is expanded on the fly.

Because of thin-provisioning, a processor sees the virtual capacity of the thin provisioned volumes mapping to the data blocks. The real capacity is much smaller, and only the data written by the processor is allocated. An advantage of thin-provisioning is that there is no need for manual steps to expand the allocated storage, since it expands automatically. A further advantage of thin-provisioning is that this method allows nearly 100% storage utilization because space allocated corresponds to real data written by the application.

In step 324, a data structure which identifies the image file as a virtual storage object such as, for example a virtual hard disk, is created. For example, a virtual hard disk may be identified by a 512-byte data structure appended to the end of the file (i.e., footer). Accordingly, a 512 byte data structure containing information such as the logical size of the disk, disk geometry, the type of disk may be created for use with the data blocks of the image file for facilitating operation of the image file as a virtual hard disk.

It should be noted that various virtual storage objects may be identified by different data structures, and thus the data structure type will depend on the virtual storage object being created. For example, virtual storage objects created using rapid provisioning techniques of the present invention may utilize headers or other metadata configurations containing a number of fields which are set according to user inputs (e.g., VHD file size) for transforming an image file into a virtual storage object.

In step 328, the image file is converted to a virtual storage object (e.g., virtual hard disks 132A and 132B) by appending the footer to the end of the image file. The virtual storage object is then ready for use.

According to embodiments of the invention, various commands (e.g., command for creating an image file, command for expanding the image file, command for setting the file valid, command for de-allocating data blocks, etc.) are sent separately but in immediate succession. According to some embodiments, the commands are executed in such rapid successions that an operating system does not start zeroing data blocks mapping to an image file between the time the command to create an image file is issued and the time the command to de-allocate data blocks associated with the file is issued.

According to embodiments, responsive to the commands, the operating system, for example, returns a status code indicating success or failure of the commands. If the status code indicates a failure, the operating system may enter an error state or an exception state.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. For example, the methods and processes discussed before can be modified by appending a different header or a footer to create other types of virtual storage objects that need to be zeroed upon creation and prior to use. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for building a virtual storage object, comprising:
    creating, by a virtual storage computing device, an image file by mapping resources to data blocks in one or more data storage devices;
    setting, by the virtual storage computing device, the mapped image file as valid, wherein the setting prevents an operating system from zeroing the mapped data blocks;
    de-allocating, by the virtual storage computing device, the data blocks, wherein the de-allocating comprises un-mapping the resources from the data blocks; and
    identifying, by the virtual storage computing device, the mapped image file as a virtual storage object.

2. The method of claim 1, wherein the virtual storage object comprises a virtual hard disk.

3. The method of claim 1, wherein the identifying further comprises:
    appending, by the virtual storage computing device, an identifying data structure to the mapped image file.

4. The method of claim 1, wherein an initial size of the image file is zero bytes.

5. The method of claim 4, further comprising:
    expanding the size of the image file to a predetermined size.

6. The method of claim 1, further comprising:
    locking, by the virtual storage computing device, the mapped data blocks, wherein the locking comprises preventing access to the mapped data blocks until the mapped data blocks are de-allocated.

7. A non-transitory computer readable medium having stored thereon instructions for virtual storage management comprising machine executable code which when executed by at least one processor causes the processor to perform steps comprising:
    creating an image file by mapping resources to data blocks in one or more data storage devices;
    setting the mapped image file as valid, wherein the setting prevents an operating system from zeroing the mapped data blocks;
    de-allocating the data blocks, wherein the de-allocating comprises un-mapping the resources from the data blocks; and
    identifying the mapped image file as a virtual storage object.

8. The medium of claim 7, further having stored thereon instructions that when executed by the processor cause the processor to perform steps further comprising:
    appending an identifying data structure to the mapped image file.

9. The medium of claim 7, wherein the virtual storage object comprises a virtual hard disk.

10. The medium of claim 7, wherein an initial size of the image file is zero bytes.

11. The medium of claim 10, further having stored thereon instructions that when executed by the processor cause the processor to perform steps further comprising:
    expanding the size of the image file to a predetermined size.

12. The medium of claim 7 further having stored thereon instructions that when executed by the processor cause the processor to perform steps further comprising:
    locking the mapped data blocks, wherein the locking comprises preventing access to the mapped data blocks until the mapped data blocks are de-allocated.

13. A virtual storage computing device comprising:
    a processor;
    a memory coupled to the processor and configured to be capable of executing programmed instructions stored in the memory comprising and stored in the memory to:
    create an image file by mapping resources to data blocks in one or more data storage devices;
    set the mapped image file as valid, wherein the setting prevents an operating system from zeroing the mapped data blocks
    de-allocate the data blocks, wherein the de-allocating comprises un-mapping the resources from the data blocks; and
    identify the mapped image file as a virtual storage object.

14. The device of claim 13, wherein the processor is further configured to be capable of executing programmed instructions further comprising and stored in the memory to:
    append an identifying data structure to the mapped image file.

15. The device of claim 13, wherein the virtual storage object comprises a virtual hard disk.

16. The device of claim 13, wherein an initial size of the image file is zero.

17. The device of claim 16, wherein the processor is further configured to be capable of executing programmed instructions comprising and stored in the memory to:
    expand the size of the image file to a predetermined size.

18. The device of claim 13, wherein the processor is further configured to be capable of executing programmed instructions comprising and stored in the memory to:
    lock the mapped data blocks, wherein the locking comprises preventing access to the mapped data blocks until the mapped data blocks are de-allocated.

* * * * *

UNITED STATES PATENT AND TRADEMARK OFFICE
CERTIFICATE OF CORRECTION

| | | |
|---|---|---|
| PATENT NO. | : 9,092,530 B1 | Page 1 of 1 |
| APPLICATION NO. | : 13/440630 | |
| DATED | : July 28, 2015 | |
| INVENTOR(S) | : Fullbright et al. | |

It is certified that error appears in the above-identified patent and that said Letters Patent is hereby corrected as shown below:

On the title page item (75), line 1, John K. Fulbright should be replaced with --John K. Fullbright-- in the listing of inventors.

Signed and Sealed this
Seventh Day of June, 2016

Michelle K. Lee
*Director of the United States Patent and Trademark Office*